United States Patent [19]

Kneubuehl et al.

[11] 4,366,174
[45] Dec. 28, 1982

[54] LOW FAT CHEESE PRODUCT SIMILAR TO SWISS CHEESE

[76] Inventors: Arnold S. Kneubuehl, 528 Baintree, Lake Summerset, Davis, Ill. 61019; Stephen A. Kneubuehl, Rte. 1, Dakota, Ill. 61018

[21] Appl. No.: 326,065

[22] Filed: Nov. 30, 1981

Related U.S. Application Data

[63] Continuation of Ser. No. 135,249, Mar. 31, 1980, abandoned.

[51] Int. Cl.$^3$ .................. A23C 19/02; A23C 19/06; A23C 19/14
[52] U.S. Cl. ...................................... 426/36; 426/40; 426/582
[58] Field of Search ........................... 426/36, 40, 582

[56] References Cited

U.S. PATENT DOCUMENTS

| | | | |
|---|---|---|---|
| 2,494,636 | 1/1950 | Stine | 426/36 |
| 2,494,637 | 1/1950 | Stine | 426/36 |
| 2,727,823 | 12/1955 | Tulane et al. | 426/36 |
| 2,864,704 | 12/1958 | Feutz, Jr. et al. | 426/36 |
| 2,871,126 | 1/1959 | Smith et al. | 426/36 |
| 4,242,362 | 12/1980 | Grigsby et al. | 426/40 |

OTHER PUBLICATIONS

Kosikowski, F., Cheese and Fermented Milk Foods, published by the Author, Ithaca, N.Y. 1966, (pp. 224-239).
Reinbold, G. W., Swiss Cheese Varieties, Pfizer Inc., N.Y., 1972 (pp. 16-23, 62-77, 95-101, 142 and 143).

*Primary Examiner*—David M. Naff
*Attorney, Agent, or Firm*—Joyce R. Niblack

[57] ABSTRACT

A low fat cheese product similar to Swiss cheese is produced containing less than 43 percent by weight fat and more than 40 percent by weight moisture, and having an excess of at least 10 mixed round and irregular holes per six inch tier. In the process of producing the cheese, the cheese is cooled to between 35° to 55° F. during pressing, cut into the desired shape, brined, put into boxes, and stored in cold storage and then in warm storage to obtain the desired round and irregular holes.

12 Claims, No Drawings

LOW FAT CHEESE PRODUCT SIMILAR TO SWISS CHEESE

This is a continuation of application Ser. No. 135,249, filed Mar. 31, 1980, now abandoned.

BACKGROUND OF THE INVENTION

Swiss cheese, one of the more popular kinds of hard cheese, is characterized by a fat content of at least 43% fat in the dry matter, 40% or less moisture and by the cheese being riddled with relatively large, relatively even holes, generally from at least one and not more than from 8 holes in a 6" tapered trier plug, the majority of the eyes in the plug being at least ½" in diameter.

Baby Swiss cheese is also characterized by the same fat and moisture standards, but has a greater number of smaller holes than Swiss cheese.

In recent years, the general public has become increasingly conscious of caloric intake and of their intake of fats, particularly saturated fats found in red meats and dairy products, as well as salt intake. Several cheese products having reduced fat and caloric content or reduced salt content, have been developed and are currently being sold. These products are, for the most part, process cheese food products.

While there are Swiss cheese products available that have reduced salt content, e.g. Lorraine Swiss cheese sold by Dominick's Food Stores and Savway Food Stores in the Chicago, Illinois area, and more recently, low fat or "cholesterol free" cheeses have become available, these products do not have the nutty flavor of Swiss cheese, and the "cholesterol free" foraminous cheese, which is like brick cheese in appearance, is not widely accepted because of its bland, flavorless taste.

The present invention provides an improved low fat, low salt, Swiss cheese-like product and an improved process for its manufacture.

SUMMARY OF THE INVENTION

The present invention provides a cheese product having the nutty flavor of Swiss cheese, and characterized by a fat content of less than 43 percent in the dry matter, a moisture content greater than 40 percent, and in excess of 10 and typically from about 30 to 60 mixed round and irregular holes per 6 inch tapered trier plug which gives the cheese a lacy appearance when sliced. An improved process for making the cheese is also provided by the present invention, characterized by cooling the cheese during the press time.

DETAILED DESCRIPTION OF PREFERRED EMBODIMENTS

The Swiss cheese-like product of the present invention comprises less than 43% fat in the dry matter and greater than 40 percent moisture, and is characterized by the presence of more than 10, typically 30 to 60 mixed round and irregular holes per 6" tapered trier plug which gives the cheese a lacy appearance and by a nutty flavor.

The cheese is produced from 0 to about 3.0 percent fat pasteurized milk, using from about ¼ to 1 percent by weight of commercial lactic culture, from about 1 to 50 ml of concentrated propionic acid culture per 1000 pounds of milk, and from about 2 to about 4 ounces of rennet or rennet substitute per 1000 pounds of milk.

The milk is heated to a temperature of from about 86° to 92° F., preferably 88° F. and the culture added thereto. From about ¼ to 1 percent by weight of the culture is added to the heated milk. Shortly thereafter, from about 1 to 50 ml of commercial concentrated propionic acid culture, such as frozen propionic culture obtained from Hansen, Milwaukee, Wisconsin, is added per 1000 pounds of milk. The milk is ripened for from about 0 to 30 minutes, preferably for about 15 minutes, and then rennet or rennet substitute in the amount of from about 2 to 4 ounces (preferably 3 ounces) per 1000 pounds of milk is added. After at least 20 minutes, the curd is cut lengthwise and crosswise, preferably with ¼ inch knives continuously cutting the curd with the vertical knife until the curd is the size of a rice size kernel. The curd is thereafter stirred for from about 10 to 35 minutes, allowed to settle, pushed away from the gate end of the vat, and ⅛ by volume of the whey is quickly removed from the vat.

The curd is then stirred again for at least 5 minutes and hot water (120° to 145° F.) equivalent to the amount of whey drawn off is added. The curd is cooked for at least 10 minutes with stirring or until the desired firmness is obtained, and then allowed to settle. Thereafter, the whey and hot water are drawn off so that approximately ⅓ of the original volume is left in the vat. The cheese curd is subsequently pumped on to a curd table, where the remaining whey and hot water are drained completely. The curd is continuously stirred until the time it is put into hoops.

The cheese curd is augered into a mold or scooped by hand into a mold. Subsequently, the cheese is pressed for at least 2 hours at from about 15 to 30 pounds p.s.i.g. of air pressure depending on the mold size.

It is critical to cool the cheese during the press time, and the cooling constitutes the improvement in the process of the present invention. It is preferred to cool by spraying the mold with cold tap water (e.g. 52° F.) for about one hour. Alternatively, the cheese can be pressed in a refrigerated room at temperatures of from 35° to 55° F., preferably about 40° F., or can be submerged in cold tap water after pressing for two hours. If the cheese is not cooled, openings inside the cheese are formed too rapidly and the hoops are forced out of the press allowing the cheese to expand and deform beyond the mold.

After pressing, the cheese may be cut into any desired shape. The cheese is then brined in high concentration salt water brine for about 3 to 10 hours, with 4 hours being preferable for a low salt cheese. The cheese is then vacuum packed, boxed and placed in cold storage at temperatures of between about 35° to 40° F. for about 24 hours. The cheese is then placed in a warm room at a temperature of greater than 50° F., preferably about 70° F., until the desired lace type openings are formed. Lace openings will appear in about two to three weeks or more depending upon the warm room temperature. The cheese is then removed from the warm room and stored in a cold storage room at approximately 36° F. until shipping.

The cheese of this invention, when sliced, has an appearance similar to a lace doily. The cheese texture is soft and mellow, and the cheese has a nutty flavor and is readily sliced.

The following examples further illustrate the present invention:

EXAMPLE 1

Production of lacy swiss-like cheese

1000 Pounds of 2.5 percent fat pasteurized milk are placed in a 150 gallon vat having a gate at one end thereof and are heated to a temperature of 88° F. One-half percent by weight of commercial lactic culture (Marshall Division of Miles Laboratories, Madison, Wisconsin) and 12 ml Hansen (Milwaukee, Wis.) frozen concentrated propionic acid culare added thereto. Three ounces of rennet are then added. After 25 minutes, the curd is cut lengthwise and crosswise using ¼ inch knives. The curd is stirred for 25 minutes, and then allowed to settle. After pushing the curd away from the gate end of the vat, one-third of the whey by volume is removed from the vat. The curd is stirred for 5 minutes and water, heated to a temperature of 120° F., equivalent to the amount of whey drawn off, is added. The curd is cooked for an additional 5 minutes at 102° F. with stirring. The curd is allowed to settle and whey and hot water are drawn off to leave approximately one-third of the original volume. The cheese curd is pumped onto a curd table, and the remaining whey and hot water are drained completely. The curd is continuously stirred until it is put into molds. The curd is augered into 40 pound block hoops over a 20 minute period, and pressed for two hours at 30 pounds p.s.i.g. of air pressure. After the first one-half hour of press time, the cheese hoops are sprayed with cold tap water for one hour. The cheese is then cut into square loaves, brined in high cncentration salt water for four hours, vacuum packed, boxed and placed into cold storage at 35° F. for 24 hours. Thereafter, the cheese is placed in a warm room and maintained at a temperature of approximately 70° F. for three weeks, removed from the warm room, and stored in a cold room at 36° F. The cheese so produced is soft, mellow and easily slicable, has a nutty flavor, and when sliced has the appearance of a lace doily.

By varying the percent fat and lactic culture, cheeses of varying fat content are obtained. Table 1 summarizes the parameters for Examples 2–5 wherein, following the method for Example 1, and altering the parameters indicated in Table 1, cheese compositions falling within the scope of the present invention are obtained.

TABLE 1

| | | | Examples 2–5 | | | |
|---|---|---|---|---|---|---|
| Ex. | % Fat | % Lactic Culture | Curd Knife Size | Stir Curd Fore-work-ing | Water Temp. ±5–10 | Cook Temp. ±2 | Cook Time |
| 2 | 3.0 | ½ of 1% | ¼" | 25 min. | 135° F. | 104° F. | 10 min. |
| 3 | 2.0 | ½ of 1% | ⅜" | 20 min. | 120° F. | 100° F. | 5 min. |
| 4 | 1.5 | ¾ of 1% | ¼" | 15 min. | 120° F. | 100° F. | 0 min. |
| 5 | 1.0 | 1% | ¼" | 15 min. | 120° F. | 100° F. | 0 min. |

Superior results are obtained when the parameters see forth for Examples 1, 2 and 3 are employed.

Prior to Apr. 4, 1980, we produced a similar cheese having a fat content complying with the standards for Swiss cheese. The general method employed in producing the low fat cheese of the present invention was employed prior to that date. However, we discovered that the process was greatly improved by the cooling step during pressing which is critical to the present invention.

If desired, the process of this invention can be used replacing the lowfat milk of the preferred embodiments with whole milk to produce a product having the fat content of Swiss cheese, yet the lacy appearance that characterizes the cheese products of the present invention.

We claim:

1. In a process for producing a low fat cheese having the nutty flavor of Swiss cheese, a fat content of less than 43 percent by weight fat in the dry matter, a moisture content of more than 40 weight percent, and having at least 10 mixed round and irregular holes per 6 inch trier which gives said cheese a lacy appearance when sliced, said process comprising the steps of heating pasteurized milk containing from 0 to 3.0 percent by weight of fat to a temperature of from about 86° to 90° F. in a vat having a gate end, adding from about ¼ to about 1 percent by weight of a lactic culture and from about 1 to 50 ml of frozen concentrated propionic culture per 1000 pounds of milk; ripening the milk for from about 0 to 30 minutes; adding from 2 to 4 ounces of rennet substitute per 1000 pounds of milk; allowing the milk to coagulate for at least 20 minutes; cutting said curd lengthwise and crosswise and thereafter stirring said curd for from about 10 to 35 minutes; allowing said curd to settle, pushing said curd away from the gate end of the vat; drawing one-third by volume of the whey from said vat; stirring said curd for approximately five minutes and thereafter adding an amount of hot water heated to a temperature of between 110° and 145° equivalent to the amount of whey drawn off, cooking said curd with stirring until the desired firmness is obtained; allowing said curd to settle; pumping said cheese curd onto a curd table with continuous stirring; and thereafter transferring said curd into molds; pressing said cheese for at least about two hours at a pressure of from about 15 to 30 pounds p.s.i.g., the improvement comprising cooling said cheese to a temperature of between 35° to 55°''' F. during said pressing for at least about two hours and thereafter cutting said cheese into the desired shape and brining said cheese for from about 3 or more hours; boxing said cheese and storing said boxed cheese first in cold storage and then in a warm room until the irregular holes which give the cheese a lacy appearance when sliced have formed; and thereafter storing said cheese in a cool room.

2. The process of claim 1 wherein said pressed cheese is cooled by spraying water onto said molds.

3. The process of claim 2 wherein said water is sprayed onto said molds for about one hour.

4. The process of claim 2 or 3 wherein said water is sprayed onto said mold after the first one-half hour of press time.

5. The process of claim 1 wherein said cheese is cooled by pressing said cheese in a refrigerated room.

6. The process of claim 5 wherein the temperature of said refrigerated room is between from about 35° F. to 55° F.

7. The process of claim 5 wherein the temperature of said refrigerated room is from about 40° F.–50° F.

8. The process of claim 1 wherein said cheese is submerged in cold water after pressing for two hours.

9. The process of claim 8 wherein the water is cold tap water.

10. A low-fat cheese product produced by the process of claim 1 having the nutty flavor of Swiss cheese, comprising less than 43 percent by weight fat in the dry matter and more than 40 percent by weight moisture and having in excess of at least 10 mixed round and irregular holes per six inch trier, said holes giving said cheese a lacy appearance when sliced.

11. The cheese of claim 10, wherein said cheese has a soft and mellow texture.

12. The cheese of claim 10 or 11 wherein said cheese has between 30 to 60 mixed round and irregular holes per 6 inch trier.

* * * * *